US010902561B2

United States Patent
Tsuji

(10) Patent No.: US 10,902,561 B2
(45) Date of Patent: Jan. 26, 2021

(54) IMAGE PROCESSING APPARATUS, IMAGE PROCESSING METHOD, AND RECORDING MEDIUM

(71) Applicant: Kyocera Document Solutions Inc., Osaka (JP)

(72) Inventor: Yuka Tsuji, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 104 days.

(21) Appl. No.: 16/234,628

(22) Filed: Dec. 28, 2018

(65) Prior Publication Data

US 2019/0206028 A1     Jul. 4, 2019

(30) Foreign Application Priority Data

Dec. 29, 2017    (JP) ................................ 2017-255191

(51) Int. Cl.
     *G06K 9/00*       (2006.01)
     *G06T 5/00*        (2006.01)

(52) U.S. Cl.
CPC .............. *G06T 5/002* (2013.01); *G06T 5/006* (2013.01); *G06T 2207/30201* (2013.01)

(58) Field of Classification Search
CPC ........... G06T 2207/30201; G06T 5/002; G06T 5/006
See application file for complete search history.

(56) References Cited

U.S. PATENT DOCUMENTS

2015/0055085 A1*   2/2015   Fonte ................... H04L 65/403
                                                                     351/178
2018/0180905 A1*   6/2018   Le ......................... A61B 5/107

FOREIGN PATENT DOCUMENTS

| JP | 2008-250407 A | 10/2008 |
|----|---------------|---------|
| JP | 2015-064768 A | 4/2015  |
| JP | 2015-118617 A | 6/2015  |

\* cited by examiner

*Primary Examiner* — Avinash Yentrapi
(74) *Attorney, Agent, or Firm* — James Judge

(57) ABSTRACT

An image processing apparatus includes a deformation estimator and a correction processing unit. The deformation estimator estimates a deformation in an image of a subject wearing eyeglasses. The eyeglasses include a pair of lenses in symmetry. The estimation is performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses. The correction processing unit calculates correction ratios of images inside both the pair of lenses based on the estimated deformations and uses the calculated correction ratio to correct the images inside the pair of lenses.

9 Claims, 9 Drawing Sheets

IMAGE PROCESSING APPARATUS, IMAGE PROCESSING METHOD, AND RECORDING MEDIUM

INCORPORATION BY REFERENCE

This application is based upon, wherein the benefit of priority is claimed from, corresponding Japanese Patent Application No. 2017-255191, filed in the Japanese Patent Office on Dec. 29, 2017, and the entire contents of which are incorporated herein by reference.

BACKGROUND

Unless otherwise indicated herein, the description in this section is not prior art to the claims in this application and is not admitted to be prior art by inclusion in this section.

In an image captured from a person wearing eyeglasses, the contour of the wearer's face in some cases may be distorted due to the eyeglasses. This phenomenon is caused by the effect where the eyeglass lenses shrink or enlarge the periphery of the eyes. A technique that has been proposed for this sort of problem is of estimating the region of the face that is shaded by the eyeglasses and a region where it is condensed, and of correcting brightness of the image in these regions so as in the corrected image to reduce shadow from the eyeglasses and facial shine due to the eyeglasses. There has been also proposed a technique that calculates first contour information as a facial contour taken around the eyeglasses and second contour information as a facial contour taken inside the eyeglasses, and corrects the facial contour taken inside the eyeglasses and sizes of eyes of a subject so as to cause the facial contour taken inside the eyeglasses to approximate more the facial contour taken outside the eyeglasses corresponding to a difference between the calculated first contour information and second contour information. Furthermore, there has been proposed a technique that when the image includes an eyeglass lens part, it is estimated which pixels are inside this eyeglass lens part, and a conversion is performed such that these estimated pixels inside the eyeglass lens part are mapped on pixels on other positions inside this eyeglass lens part.

SUMMARY

An image processing apparatus according to one aspect of the disclosure includes a deformation estimator and a correction processing unit. The deformation estimator estimates a deformation in an image of a subject wearing eyeglasses. The eyeglasses include a pair of lenses in symmetry. The estimation is performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses. The correction processing unit calculates correction ratios of images inside both the pair of lenses based on the estimated deformations and uses the calculated correction ratio to correct the images inside the pair of lenses.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
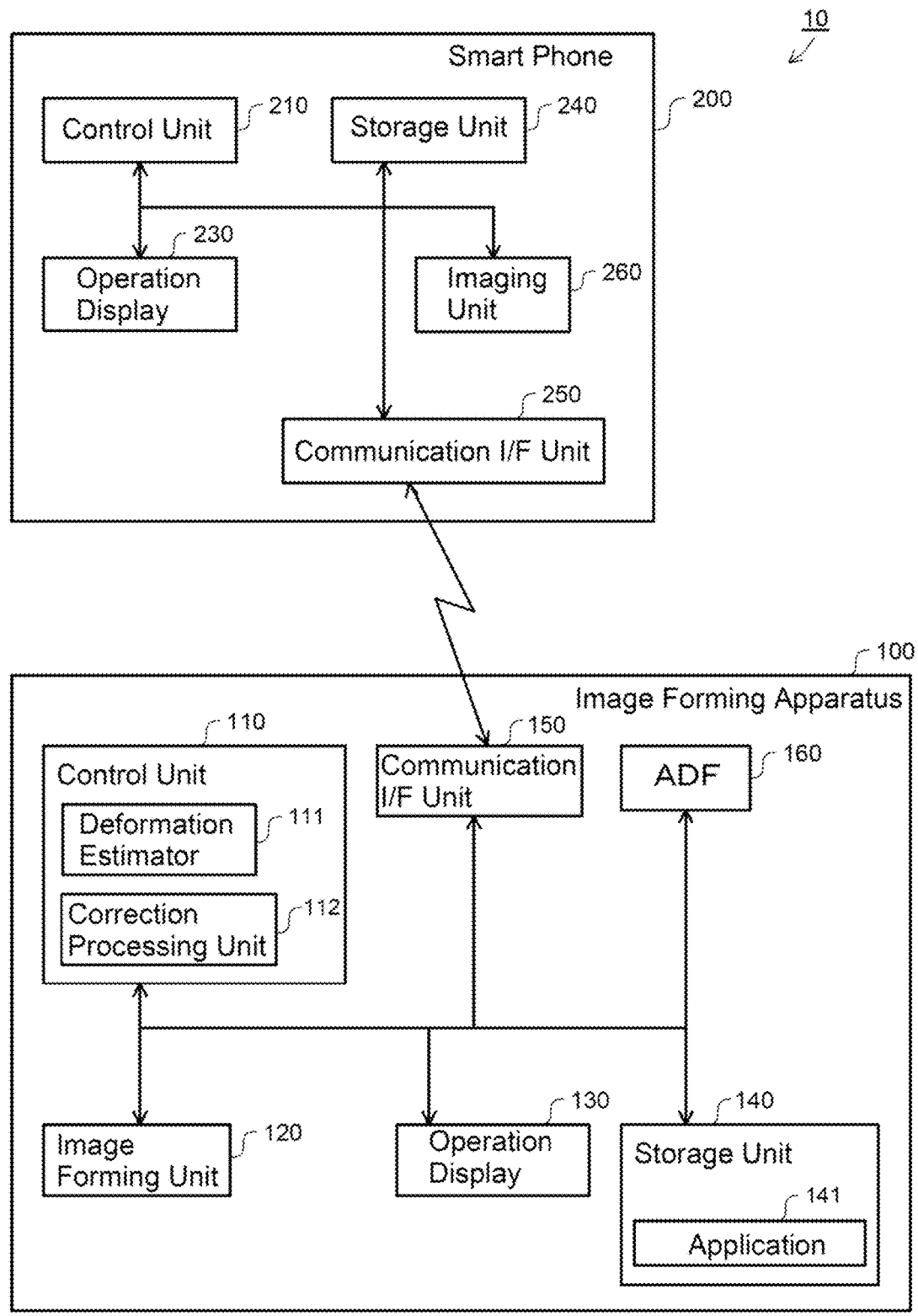
FIG. 1 illustrates a block diagram of a functional configuration of an image reading system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes configurations to execute the disclosure (hereinafter referred to as "embodiment") with reference to the drawings.

FIG. 1 illustrates a block diagram of a functional configuration of an image reading system 10 according to one embodiment of the disclosure. The image reading system 10 includes an image forming apparatus 100 and a smart phone 200. The image forming apparatus 100 includes a control unit 110, an image forming unit 120, an operation display 130, a storage unit 140, a communication interface unit (also referred to as communication I/F) 150, and an automatic document feeder (ADF) 160.

The smart phone 200 includes a control unit 210, an operation display 230, a storage unit 240, a communication interface unit (also referred to as communication I/F) 250, and an imaging unit 260. The smart phone 200 is connected to the image forming apparatus 100 with a short-range wireless communication using the communication interface unit 150 and the communication interface unit 250. This embodiment uses Bluetooth® Class 1 for the short-range wireless communications. Bluetooth® Class 1, a protocol for a 100 mW maximum output, provides short-range wireless communications enabling transmission/reception between the image forming apparatus 100 and the smart phone 200 within a distance of about 100 m.

The operation display 130 of the image forming apparatus 100 and the operation display 230 of the smart phone 200 serve as touch panels, display various menus as entry screens, and accept operation inputs by a customer.

The control units 110 and 210 each include a main storage unit, such as a RAM and a ROM, and a control unit, such as a micro-processing unit (MPU) and a central processing unit (CPU). The control unit 110 includes a controller function that pertains to an interface, such as any hardware including various kinds of I/Os, a universal serial bus (USB), and a bus. The control units 110 and 210 control a whole image forming apparatus 100 and smart phone 200, respectively.

The storage units 140 and 240 are storage devices that include a hard disk drive, a flash memory, or similar medium, which are non-transitory recording media, and store control programs and data for processes executed by the control units 110 and 210, respectively. The storage unit 140 stores a document image obtaining application program 141 (also simply referred to as an application) in order to be installed in the smart phone 200. The control unit 110 includes a deformation estimator 111 and a correction processing unit 112. Functions of the deformation estimator 111 and the correction processing unit 112 will be described later.

In this embodiment, the smart phone 200 can execute the eyeglasses image correction process similarly to the image forming apparatus 100 by downloading the document image obtaining application program 141 from the storage unit 140 of the image forming apparatus 100 and installing it in the storage unit 240.

Figure 2:
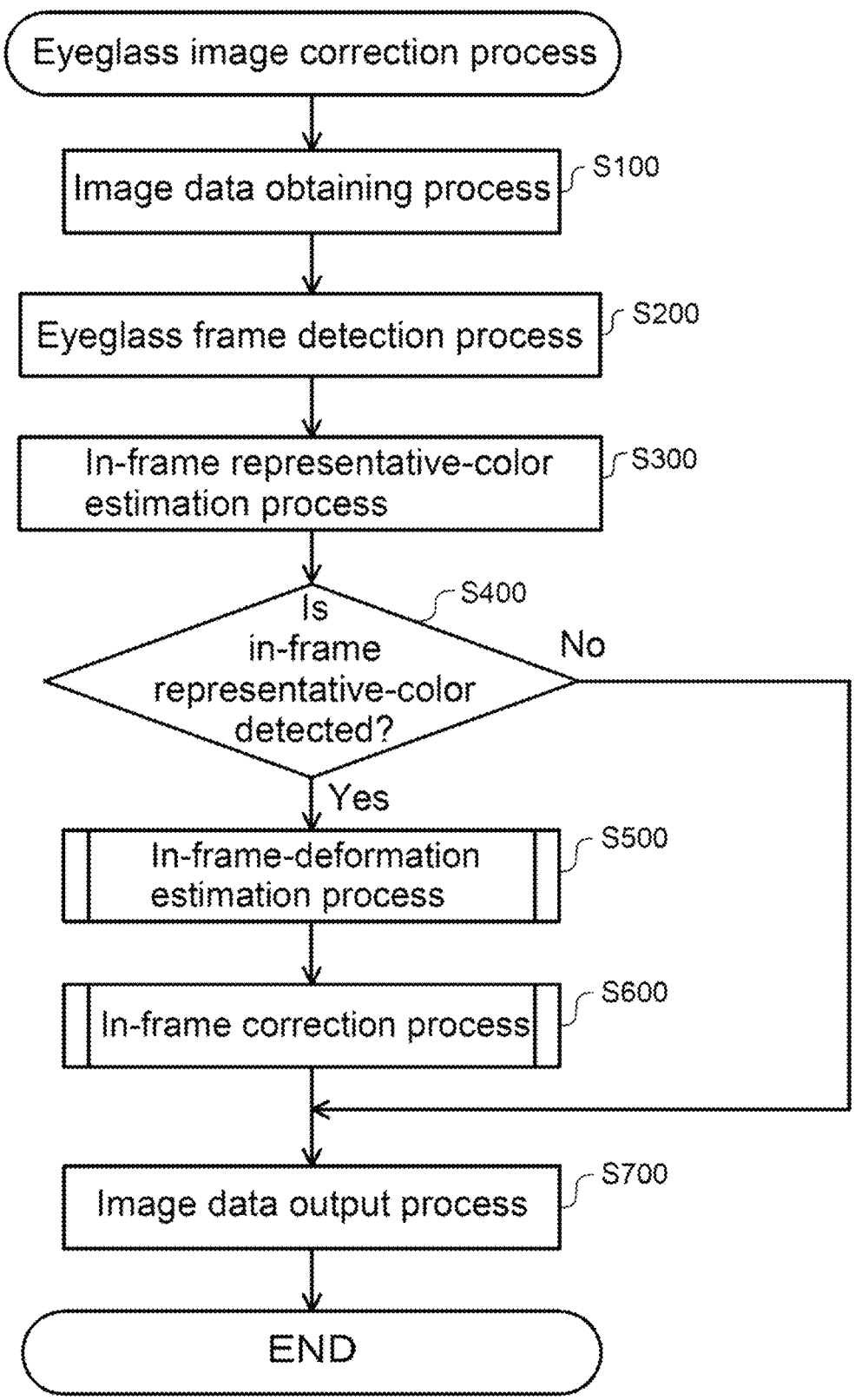
FIG. 2 illustrates contents of eyeglasses image correction process according to the one embodiment.

FIG. 2 illustrates contents of eyeglasses image correction process according to the one embodiment. FIGS. 3A to 3D illustrate states of modeling eyeglass lenses according to the one embodiment. In Step S100, the smart phone 200 executes the image data obtaining process using the imaging unit 260.

In the image data obtaining process, the imaging unit 260 images a subject (described below) wearing eyeglasses and transmits raw image data (raw image format) to the image forming apparatus 100. The raw image data is image data before executing a raw development process. The raw image data is transmitted to a personal computer 300 without the raw development process.

In Step S200, the deformation estimator 111 executes eyeglasses frame detection process. In the eyeglasses frame detection process, the deformation estimator 111 executes a face-recognition process to detect eyeglasses frame FRM and a pair of eyeglass lenses LL and LR from face images using any method including pattern matching (see FIG. 3A). The pair of eyeglass lenses LL and LR are assumed to have a laterally symmetrical shape.

In Step S300, the deformation estimator 111 executes an in-frame representative-color estimation process. In the in-frame representative-color estimation process, the deformation estimator 111 obtains a representative color constituting an image in an inner region of the pair of eyeglass lenses LL and LR in the inner region at a plurality of points inside the inner region.

In Step S400, the deformation estimator 111 determines whether or not the in-frame representative-color is detected inside the face of the subject. This is because, when the in-frame representative-color is not detected inside the subject face, it is assumed that the pair of eyeglass lenses LL and LR reflect to cause the eye and the contour of the subject to be unseen inside the pair of eyeglass lenses LL and LR, thus eliminating the need for a correction.

When the in-frame representative-color is detected inside the subject face (outside the frame), the deformation estimator 111 advances the process to Step S500, and when the in-frame representative-color is not detected inside the subject face (outside the frame), the process proceeds to Step S700. In Step S500, the deformation estimator 111 executes the in-frame-deformation estimation process.

Figure 4:
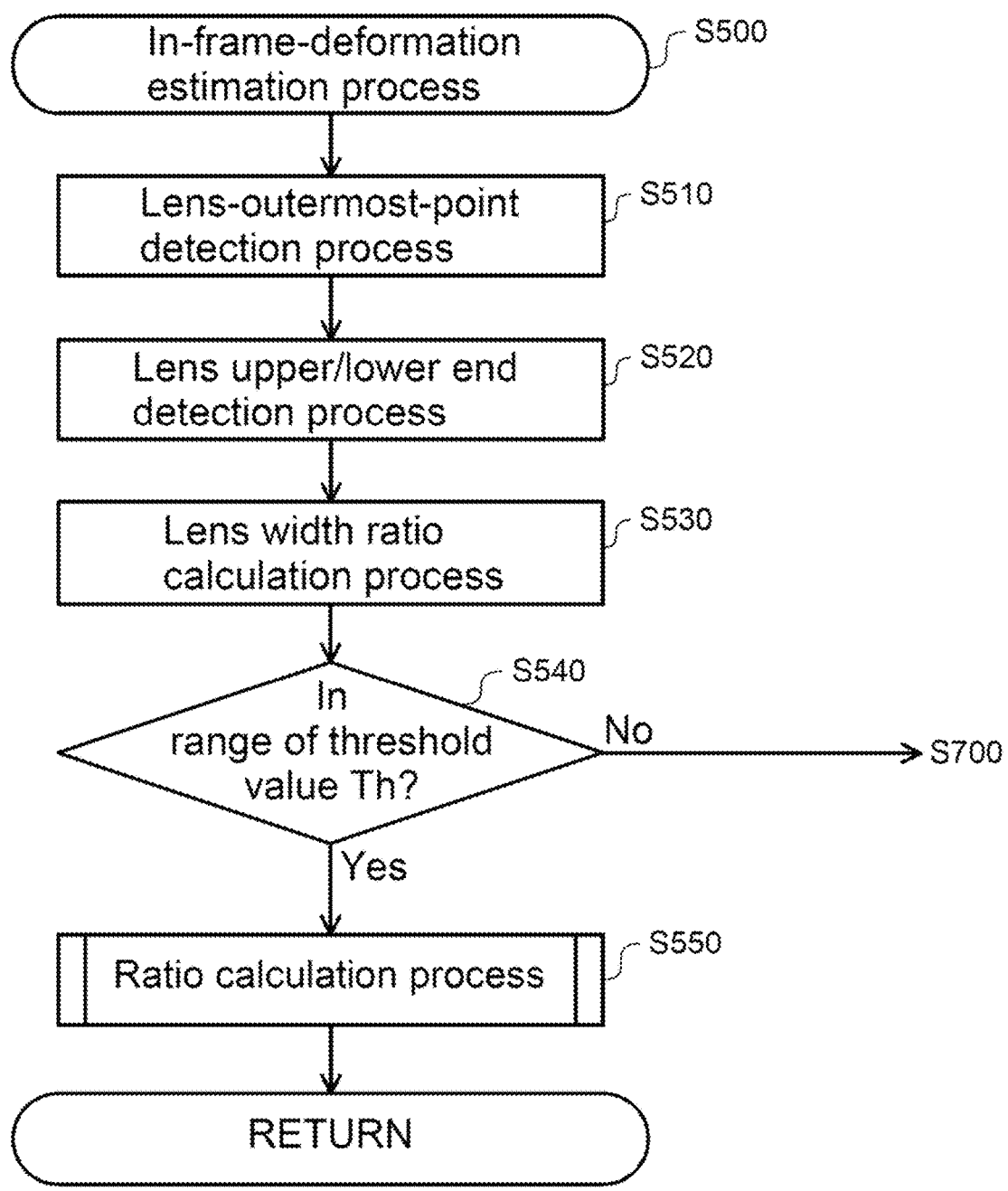
FIG. 4 illustrates contents of an in-frame-deformation estimation process according to the one embodiment.

FIG. 4 illustrates contents of the in-frame-deformation estimation process (Step S500) according to the one embodiment. In Step S500, the deformation estimator 111 models the pair of eyeglass lenses LL and LR using the laterally symmetrical shape of the pair of eyeglass lenses LL and LR, and executes the following processes.

In Step S510, the deformation estimator 111 executes a lens-outermost-point detection process. In the lens-outermost-point detection process, the deformation estimator 111 identifies respective four outermost points (eight points in total) of the pair of eyeglass lenses LL and LR (see FIG. 3B).

In Step S520, the deformation estimator 111 executes a lens upper/lower end detection process. In the lens upper/lower end detection process, the deformation estimator 111 uses the total eight outermost points to obtain an upper-end tangent LT connecting upper ends of the pair of eyeglass lenses LL and LR and a lower-end tangent LB connecting lower ends of the pair of eyeglass lenses LL and LR. The deformation estimator 111 can reproduce the image when the pair of eyeglass lenses LL and LR face the imaging unit 260 (see FIG. 3C) using that the upper-end tangent LT and the lower-end tangent LB can be defined as a pair of mutually parallel lines based on the symmetrical shape of the eyeglasses.

The deformation estimator 111 can estimates an inclination angle of the subject face with respect to the imaging unit 260 using the face recognition process of the subject wearing the eyeglasses with the pair of eyeglass lenses LL and LR, so as to use the estimation result to reproduce the image when the pair of eyeglass lenses LL and LR squarely face the imaging unit 260. Accordingly, the deformation estimator 111 can reproduce the image of the pair of eyeglass lenses LL and LR when the pair of eyeglass lenses LL and LR are assumed to face the imaging unit 260 even if the pair of eyeglass lenses LL and LR have an angle with respect to one another (that is, the frame FRM is bent viewing from the top.

The deformation estimator 111 uses the image of the pair of eyeglass lenses LL and LR when the pair of eyeglass lenses LL and LR are assumed to face the imaging unit 260 to define: an outer left end tangent LL1 passing through a left end of the left-side eyeglass lens LL and perpendicular to the upper-end tangent LT and the lower-end tangent LB; an inner right end tangent LL2 passing through a right end of the left-side eyeglass lens LL and perpendicular to the upper-end tangent LT and the lower-end tangent LB; an outer right end tangent LR1 passing through a right end of the right-side eyeglass lens LR and perpendicular to the upper-end tangent LT and the lower-end tangent LB; and an inner left end tangent LR2 passing through a left end of the right-side eyeglass lens LR and perpendicular to the upper-end tangent LT and the lower-end tangent LB, as mutually parallel four lines.

The deformation estimator 111 defines: an intersection point of the upper-end tangent LT and the outer left end tangent LL1 as a first diagonal intersection point PLT1; an intersection point of the upper-end tangent LT and the inner right end tangent LL2 as a first inner intersection point PLT2; an intersection point of the upper-end tangent LT and the inner left end tangent LR2 as a second inner intersection point PRT2; and an intersection point of the upper-end tangent LT and the outer right end tangent LR1 as a second diagonal intersection point PRT1.

The deformation estimator 111 defines: an intersection point of the lower-end tangent LB and the outer left end tangent LL1 as a third diagonal intersection point PLB1; an intersection point of the lower-end tangent LB and the inner right end tangent LL2 as a third inner intersection point PLB2; an intersection point of the lower-end tangent LB and the inner left end tangent LR2 as a fourth inner intersection point PRB2; and an intersection point of the lower-end tangent LB and the outer right end tangent LR1 as a fourth diagonal intersection point PRB1.

Figure 3A:
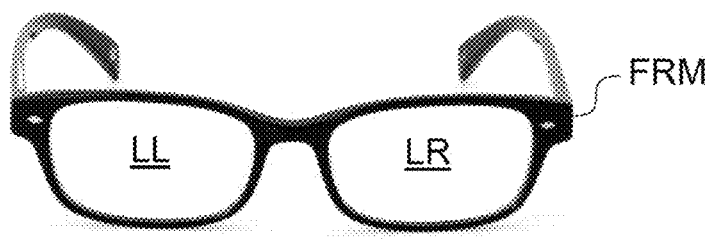
FIGS. 3A to 3D illustrate states of modeling eyeglass lenses according to the one embodiment.
Figure 3B:
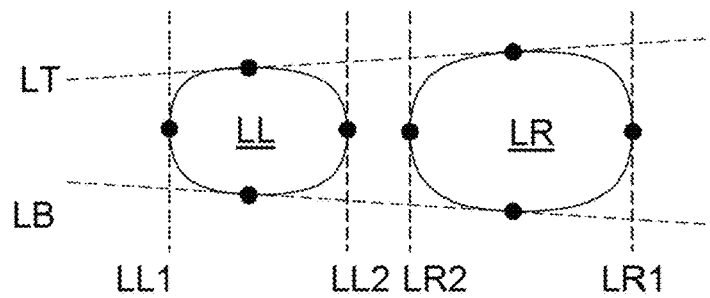
Figure 3C:
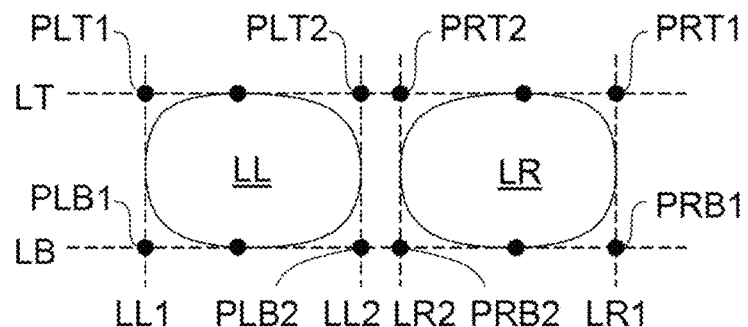
Figure 3D:
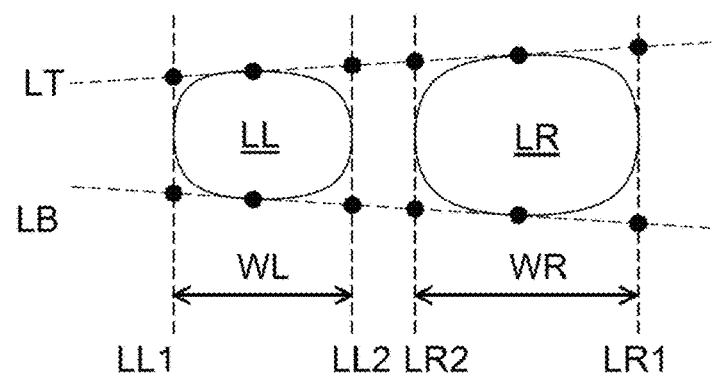

In Step S530, the deformation estimator 111 executes a lens width ratio calculation process. In the lens width ratio calculation process, the deformation estimator 111 calculates a width WL of the left-side eyeglass lens LL and a width WR of the right-side eyeglass lens LR in an apparent state viewed from the imaging unit 260 (see FIG. 3D). Next, the deformation estimator 111 calculates a lens width ratio LWR as a ratio of the width WL of the left-side eyeglass lens LL to the width WR of the right-side eyeglass lens LR. FIG. 3D exaggeratedly illustrates the inclination for easy understanding.

In Step S540, the deformation estimator 111 determines whether or not the lens width ratio LWR is in a range of a threshold value Th. The threshold value Th is set as a value to determine whether or not the inclination angle of the face is in a range where an appropriate correction can be performed (allowability of correction) with the method according to the embodiment. The threshold value Th can be set to, for example, 0.9 to 1.1.

When the lens width ratio LWR is determined to be in the range of the threshold value Th, the deformation estimator 111 advances the process to Step S550, and when the lens width ratio LWR is not determined to be in the range of the threshold value Th, the process proceeds to Step S700 (see FIG. 2). In Step S550, the deformation estimator 111 executes a ratio calculation process.

Figure 5:
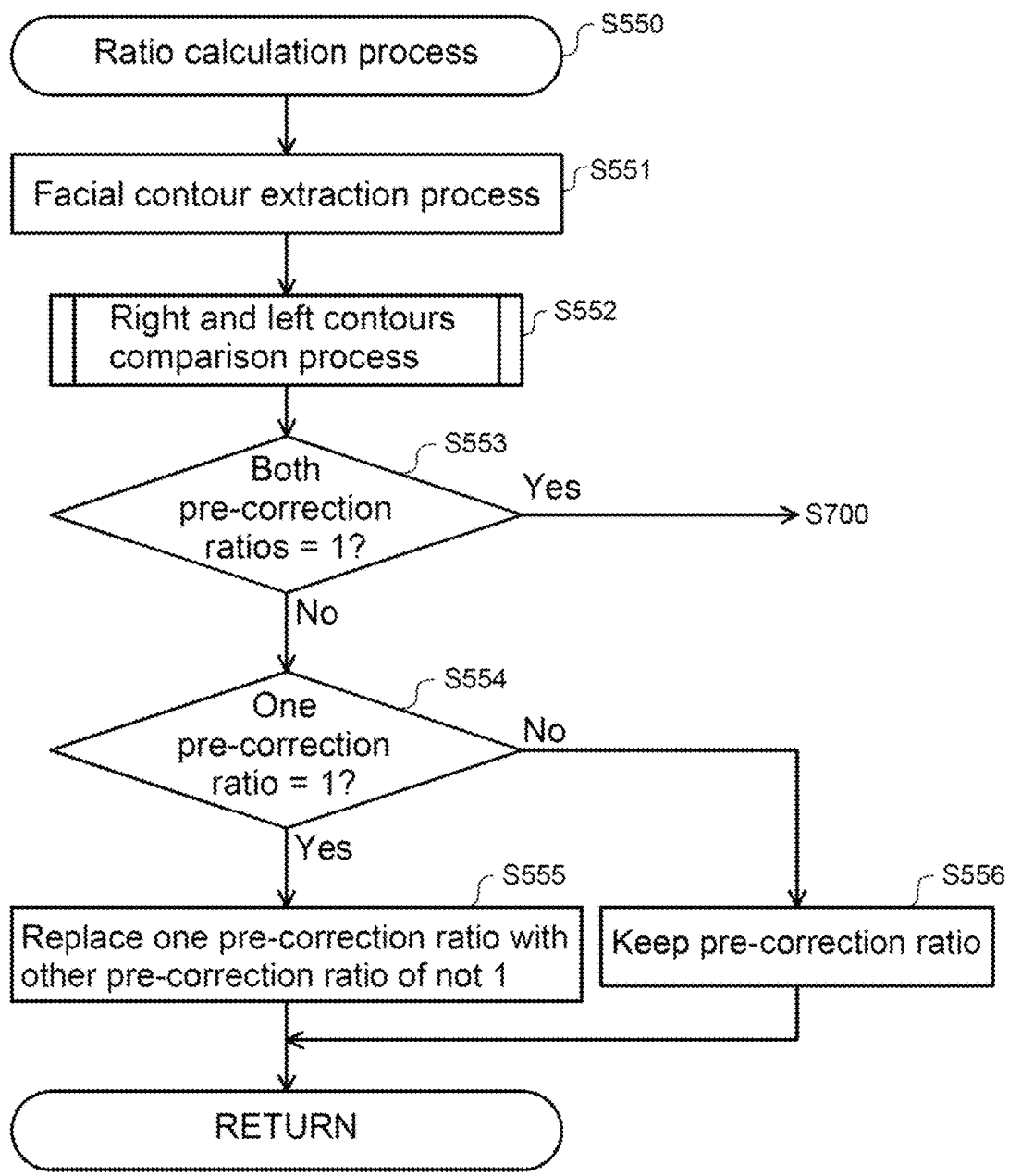
FIG. 5 illustrates contents of a ratio calculation process according to the one embodiment.
Figure 6A:
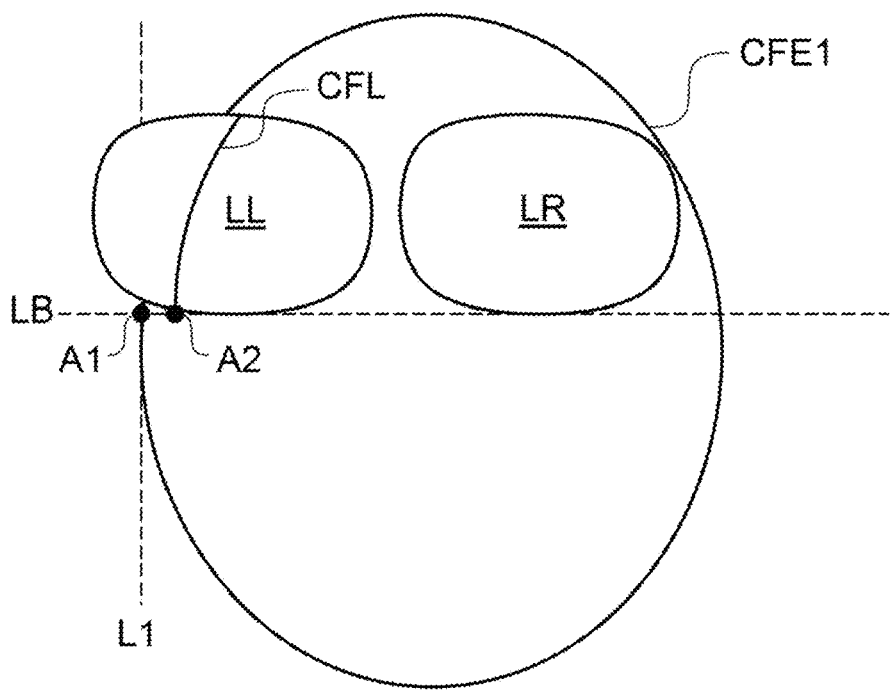
FIGS. 6A and 6B illustrate states of a contour comparison process according to the one embodiment.
Figure 6B:
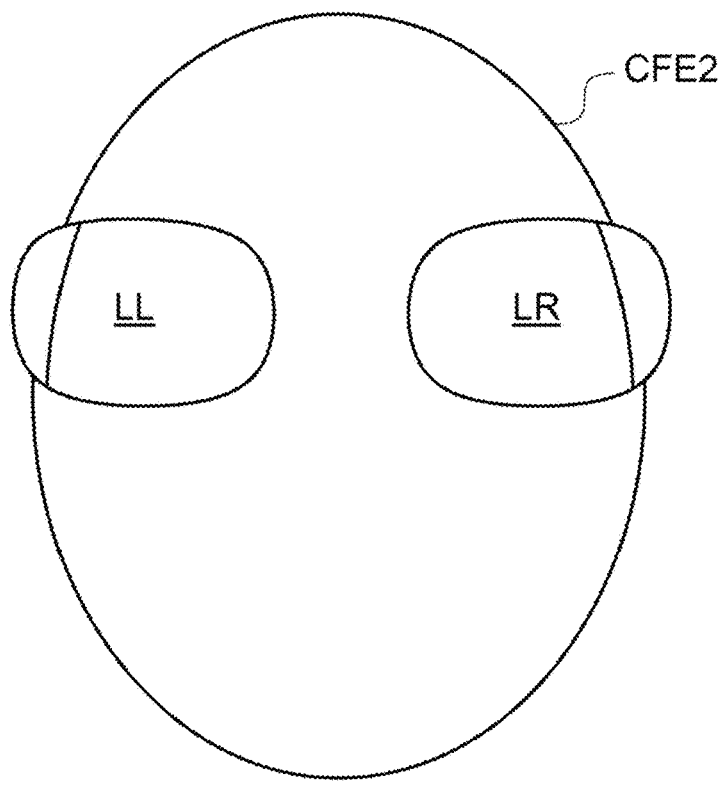

FIG. 5 illustrates contents of the ratio calculation process (Step S550) according to the one embodiment. FIGS. 6A and 6B illustrate states of a contour comparison process according to the one embodiment. In Step S551, the deformation estimator 111 executes a facial contour extraction process. In the facial contour extraction process, the deformation estimator 111 extracts a facial contour line of the subject. The facial contour line includes an out-of-lens contour line CFE1 viewable on an outer side of (outside) the left-side eyeglass lens LL and an in-lens contour line CFL viewable on an inner side of the left-side eyeglass lens LL (see FIG. 6A). In Step S552, the deformation estimator 111 executes the contour comparison process for the right and left contours.

Figure 7:
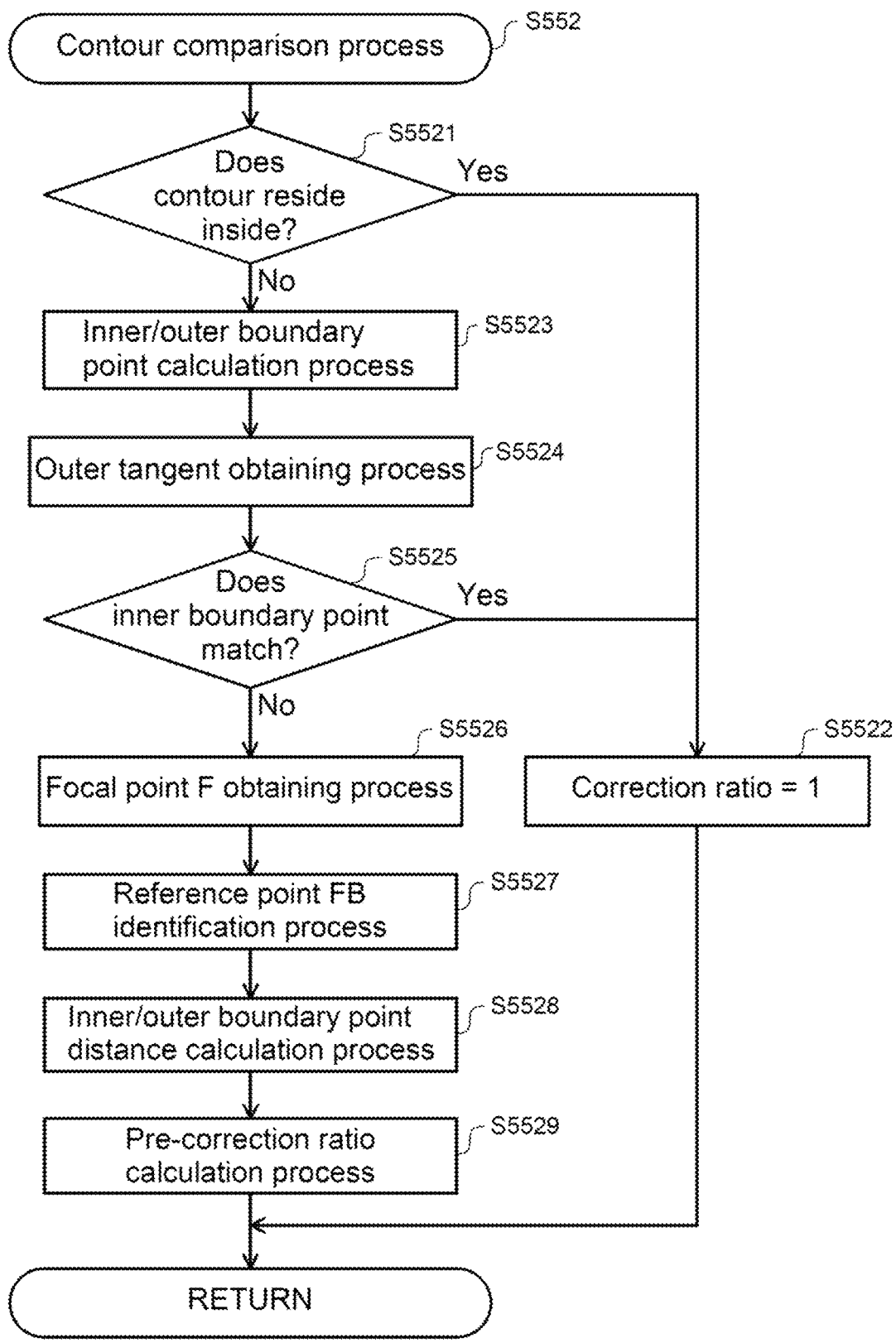
FIG. 7 illustrates contents of the contour comparison process according to the one embodiment.

FIG. 7 illustrates contents of the contour comparison process (Step S552) according to the one embodiment. In Step S5521, the deformation estimator 111 determines whether or not the facial contour resides inside at least one of the pair of eyeglass lenses LL and LR. When the deformation estimator 111 determines the facial contour not to reside inside both eyeglass lenses, the process proceeds to Step S5522, and when the deformation estimator 111 determines the facial contour to reside inside at least one of the eyeglass lenses, the process proceeds to Step S5523. When the facial contour resides inside at least one of the eyeglass lenses includes when both side contours of the face are detected inside both of the pair of the eyeglass lenses and when the facial contour on one side is detected inside only one of the pair of the eyeglass lenses.

In this example, the in-lens contour line CFL resides inside the left-side eyeglass lens LL while the in-lens contour line does not reside inside the right-side eyeglass lens LR (see FIG. 6A). Accordingly, the deformation estimator 111 advances the process to Step S5523 for the left-side eyeglass lens LL while advancing the process to Step S5522 for the inside of the right-side eyeglass lens LR. In Step S5522, since the deformation estimator 111 cannot directly calculate a correction ratio using a position of the facial contour, the deformation estimator 111 tentatively sets the correction ratio to 1.

In Step S5523, the deformation estimator 111 executes an inner/outer boundary point calculation process. In the inner/outer boundary point calculation process, the deformation estimator 111 identifies an intersection point of the lower-end tangent LB and the out-of-lens contour line CFE1 as an out-of-lens contour intersection point A1, and identifies an intersection point of the lower-end tangent LB and the in-lens contour line CFL or its extended line as an in-lens contour intersection point A2. The extended line can be generated using, for example, an approximated curve of the in-lens contour line CFL.

The intersection point of the lower-end tangent LB and the in-lens contour line CFL has a wide meaning not only indicating the actual intersection point of the lower-end tangent LB and the in-lens contour line CFL, but also indicating a wider meaning including the intersection point of the lower-end tangent LB and the extended line of the in-lens contour line CFL.

The reason why the intersection point with the lower-end tangent LB is used is that the lower end of the eyeglasses is positioned close to the center of the face in the up-down direction, and the intersection point has a position in the up-down direction where distortion of the facial contour most significantly appears because it is close to the eyeglasses. Furthermore, the lower-end tangent LB can identify a horizontal direction of the face using the symmetry of the pair of eyeglass lenses LL and LR in the lateral direction. However, not limited to the intersection point with the lower-end tangent LB, a line parallel to the lower-end tangent LB may be configured near the lower-end tangent LB (for example, the center position of the face in the up-down direction).

In Step S5524, the deformation estimator 111 executes an outer tangent obtaining process. In the outer tangent obtaining process, the deformation estimator 111 identifies a line passing through the out-of-lens contour intersection point A1 and perpendicular to the lower-end tangent LB as a contour base line L1. The in-lens contour intersection point A2 would be a point arranged on the contour base line L1 without refraction due to the left-side eyeglass lens LL does not occur.

In Step S5525, the deformation estimator 111 determines whether or not the inner boundary point matches. That is, the deformation estimator 111 determines whether or not the out-of-lens contour intersection point A1 matches the in-lens contour intersection point A2. When the deformation estimator 111 determines that both do not match, the process proceeds to Step S5526, and when the deformation estimator 111 determines that both match one another, the process proceeds to Step S5522. In Step S5522, since both match one another, the deformation estimator 111 determines that the refraction due to the left-side eyeglass lens LL does not occur and the correction is unnecessary, thus setting the correction ratio to 1.

Figure 8A:
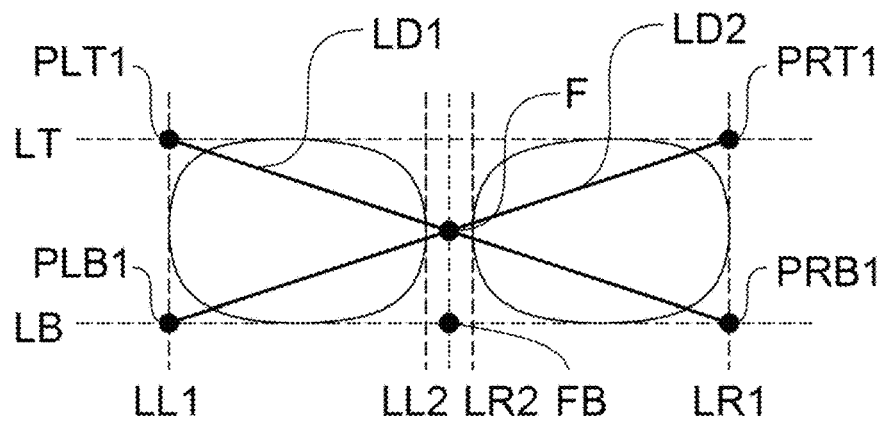
FIGS. 8A to 8C illustrate contents of the ratio calculation process according to the one embodiment.
Figure 8B:
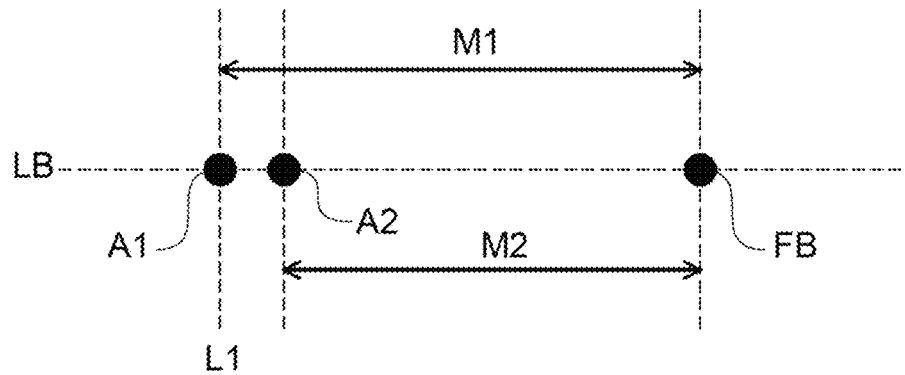
Figure 8C:
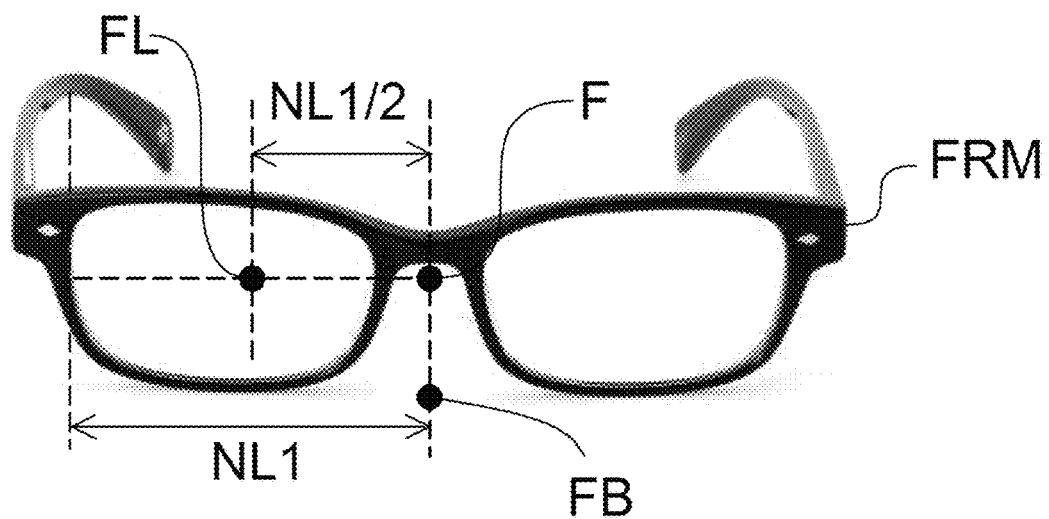

FIGS. 8A to 8C illustrate contents of the ratio calculation process according to the one embodiment. In Step S5526, the deformation estimator 111 executes a focal point F obtaining process. In the focal point F obtaining process, the deformation estimator 111 obtains an intersection point F of a straight line LD1 connecting the first diagonal intersection point PLT1 to the fourth diagonal intersection point PRB1 and a straight line LD2 connecting the second diagonal intersection point PRT1 and the third diagonal intersection point PLB1 as a focal point F.

In Step S5527, the deformation estimator 111 executes a reference point FB identification process. In the reference point FB identification process, the deformation estimator 111 obtains a point at which a straight line perpendicular to the lower-end tangent LB is extended from the intersection point F to intersect with the lower-end tangent LB, as a reference point FB (see FIG. 8A).

In Step S5528, the deformation estimator 111 executes an inner/outer boundary point distance calculation process. In the inner/outer boundary point distance calculation process, the deformation estimator 111 obtains an out-of-lens contour distance M1 from the reference point FB to the out-of-lens contour intersection point A1 and an in-lens contour distance M2 from the reference point FB to the in-lens contour intersection point A2 (see FIG. 8B).

In Step S5529, the deformation estimator 111 executes a pre-correction ratio calculation process. In the pre-correction ratio calculation process between the inside and the outside, the deformation estimator 111 calculates a pre-correction ratio RL (=M2/M1) as a ratio of the in-lens contour distance M2 to the out-of-lens contour distance M1. The pre-correction ratio RL is a reduction ratio representing a degree of the deformation of the image due to the refraction of the lens.

The pre-correction ratio RL varies corresponding to strengths of the pair of eyeglass lenses LL and LR. Specifically, the eyeglasses for near sight has the pre-correction ratio RL less than 1 (a region inside the lens is decreased by refraction), while the eyeglasses for far sight has the pre-correction ratio RL more than 1 (the region inside the lens is enlarged by the refraction).

In Step S553 (see FIG. 5), the deformation estimator 111 determines whether or not both right and left pre-correction ratios RL are 1. When the deformation estimator 111 determines that both pre-correction ratios RL are 1, the correction is unnecessary, and the process proceeds to Step S700 (see FIG. 2), and when the deformation estimator 111 determines that at least one of the right and left pre-correction ratios RL is not 1, the process proceeds to Step S554.

In Step S554, the deformation estimator 111 determines whether or not one pre-correction ratio RL is 1. When the deformation estimator 111 determines that the one pre-correction ratio RL is 1, the process proceeds to Step S555, and when both right and left pre-correction ratios RL are not 1, the process proceeds to Step S556.

In Step S555, the deformation estimator 111 replaces one pre-correction ratio RL (the value is "1") with the other pre-correction ratio RL that is not 1. Specifically, in the example of FIG. 6A, the deformation estimator 111 replaces the tentative correction ratio 1 of the right-side eyeglass lens LR with the correction ratio (an inverse of the pre-correction ratio RL) of the left-side eyeglass lens LL.

In Step S556, in the example of FIG. 6B, the deformation estimator 111 keeps each of the correction ratio of the left-side eyeglass lens LL and the correction ratio of the right-side eyeglass lens LR. Since both the left-side eyeglass lens LL and the right-side eyeglass lens LR can directly calculate the correction ratio using the facial contour CFE2, the respective calculated correction ratio can be used.

In Step S600 (see FIG. 2), the deformation estimator 111 executes an in-frame correction process. In the in-frame correction process, the deformation estimator 111 uses the correction ratio to correct the images on the respective insides of the pair of eyeglass lenses LL and LR.

Figure 9:
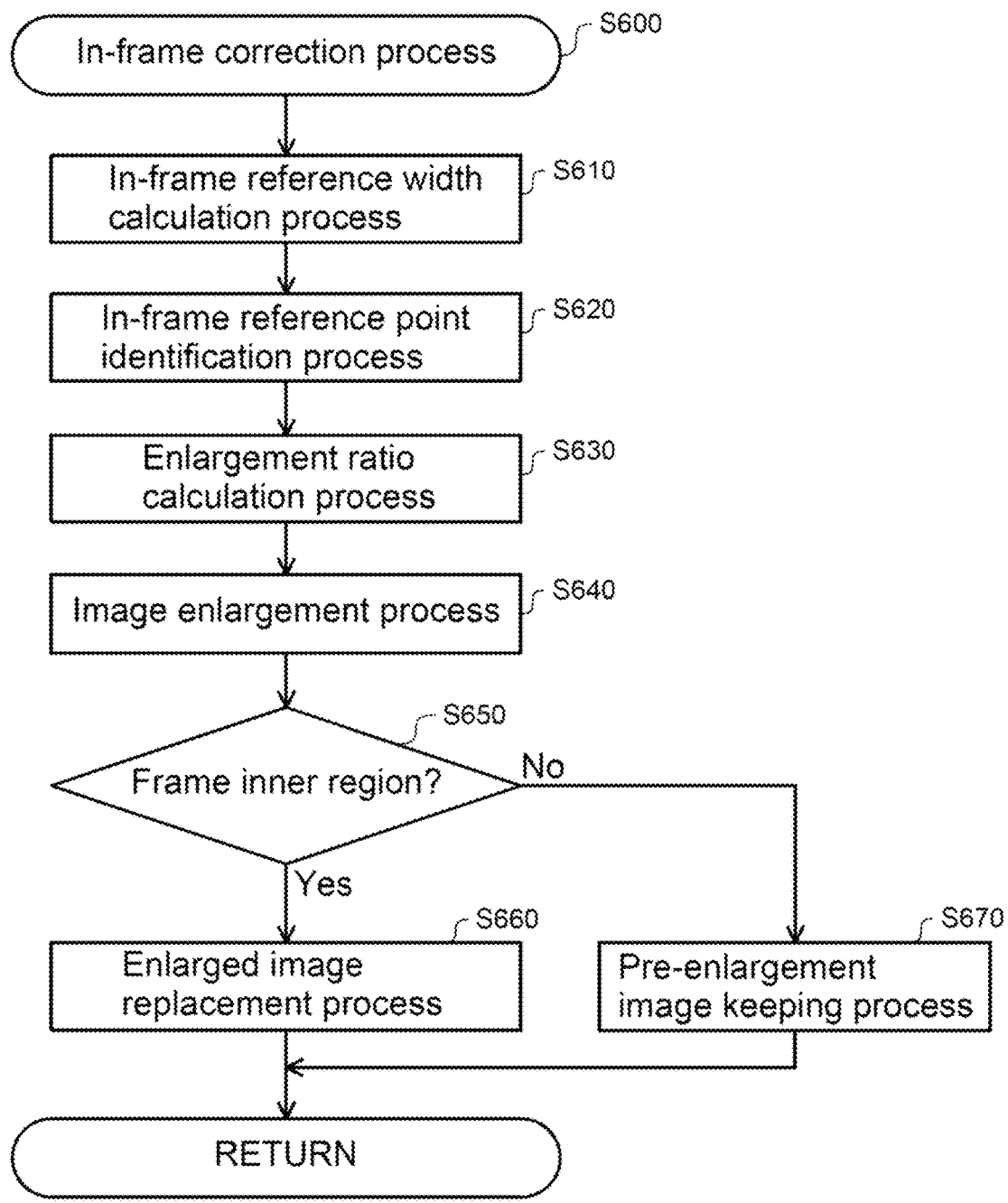
FIG. 9 illustrates contents of an in-frame correction process according to the one embodiment.

FIG. 9 illustrates contents of an in-frame correction process (Step S600) according to the one embodiment. In Step S610, the correction processing unit 112 executes an in-frame reference width calculation process. In the in-frame reference width calculation process, the correction processing unit 112 calculates an in-frame reference width NL1 (see FIG. 8C). The in-frame reference width NL1 is a distance from the focal point F to the outer left end tangent LL1. The outer left end tangent LL1 is a line passing through the left end of the left-side eyeglass lens LL and perpendicular to the upper-end tangent LT and the lower-end tangent LB.

In Step S620, the correction processing unit 112 executes an in-frame reference point identification process. In the in-frame reference point identification process, the correction processing unit 112 identifies an in-frame reference point FL. The in-frame reference point FL is a point having a distance half of the in-frame reference width NL1 from the focal point F on a line passing through the focal point F and parallel to the lower-end tangent LB.

In Step S630, the correction processing unit 112 executes an enlargement ratio calculation process. In the enlargement ratio calculation process, the correction processing unit 112 takes the inverse of the pre-correction ratio RL (=M2/M1) as an enlargement ratio RE. In this embodiment, the enlargement ratio RE corresponds to the correction ratio.

In Step S640, the correction processing unit 112 executes an image enlargement process. In the image enlargement process, the correction processing unit 112 enlarges the image in the inner region of the left-side eyeglass lens LL around the in-frame reference point FL with the enlargement ratio RE, thus generating an enlarged image.

In Step S650, the correction processing unit 112 determines whether or not each pixel of the enlarged image is in the inner region of the left-side eyeglass lens LL for each pixel. When the correction processing unit 112 determines that each pixel of the enlarged image is in the inner region of the left-side eyeglass lens LL, the process proceeds to Step S660, and when the correction processing unit 112 determines that each pixel of the enlarged image is not in the inner region of the left-side eyeglass lens LL, the process proceeds to Step S670.

In Step S660, the correction processing unit 112 replaces an original image before the enlargement in the inner region of the left-side eyeglass lens LL with the enlarged image. In Step S670, the correction processing unit 112 keeps the original image before the enlargement in the inner region of the left-side eyeglass lens LL.

In Step S700 (see FIG. 2), the control unit 110 executes an image data output process. In the image data output process, the control unit 110 performs the raw development process on the raw image data, converts the raw image data into image data small in data size, such as Jpeg data, and outputs the converted data. The image forming apparatus 100 can also output the data as a printed matter using the image forming unit 120.

Thus, the image reading system 10 according to the one embodiment ensures the image processing assuming the subject wearing the eyeglasses to be inclined with respect to an image obtaining apparatus. Furthermore, this method uses the symmetry of the outer shapes of the pair of eyeglass lenses LL and LR, thus having the advantage of ensuring the smooth correction even if eyelids are closed.

Modifications

The disclosure can be executed with the following modification in addition to the above-described embodiment.

While the disclosure is applied to the image forming apparatus in the above-described embodiment, the disclosure is applicable to a mobile device (including a smart phone) that includes an image processing apparatus and an imaging unit.

Exemplary Embodiment of the Disclosure

The image processing apparatus of the disclosure includes the deformation estimator and the correction processing unit. The deformation estimator estimates a deformation in an image of a subject wearing eyeglasses. The eyeglasses include a pair of lenses in symmetry. The estimation is performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses. The correction processing unit calculates correction ratios of images inside both the pair of lenses based on the estimated deformations. The correction processing unit uses the calculated correction ratio to correct the images inside the pair of lenses.

The image processing method of the disclosure includes: estimating a deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses; and calculating correction ratios of images inside both the pair of lenses based on the estimated deformations, and using the calculated correction ratio to correct the images inside the pair of lenses.

The image processing program of the disclosure causes the image processing apparatus to function as the deformation estimator and the correction processing unit. The deformation estimator estimates a deformation in an image of a subject wearing eyeglasses. The eyeglasses include a pair of lenses in symmetry. The estimation is performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses. The correction processing unit calculates correction ratios of images inside both the pair of lenses based on the estimated deformations and uses the calculated correction ratio to correct the images inside the pair of lenses.

Effect of the Disclosure

The disclosure can provide a technique that ensures image processing configured to support a subject wearing eyeglasses to be inclined with respect to an image obtaining apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
a deformation estimator for estimating deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, wherein the deformation estimator
identifies a lower-end tangent passing through lower ends of the pair of lenses,
identifies an out-of-lens contour intersection point as an intersection point of the identified lower-end tangent and an out-of-lens contour line as a facial contour detected outside the pair of lenses,
identifies an in-lens contour intersection point as an intersection point of the identified lower-end tangent and an in-lens contour line as a facial contour detected inside the pair of lenses, and
uses the out-of-lens contour intersection point and the in-lens contour intersection point to estimate the deformations; and
a correction processing unit for calculating correction ratios of images inside both the pair of lenses based on the estimated deformations and using the calculated correction ratios to correct the images inside the pair of lenses.

2. An image processing apparatus comprising:
a deformation estimator for estimating deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, the deformation estimator calculating a lens width ratio as a ratio of widths of both the pair of lenses, and determining an allowability of the correction when the lens width ratio is in a range of a predetermined threshold value; and
a correction processing unit for calculating correction ratios of images inside both the pair of lenses based on the estimated deformations and using the calculated correction ratios to correct the images inside the pair of lenses, the correction processing unit executing the correction when the deformation estimator determines the correction to be allowable.

3. An image processing apparatus comprising:
a deformation estimator for estimating deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, the deformation estimator executing a face-recognition process, using the face-recognition process to estimate an inclination angle of the face, and determining the allowability of the correction based on the inclination angle; and a correction processing unit for calculating correction ratios of images inside both the pair of lenses based on the estimated deformations and using the calculated correction ratios to correct the images inside the pair of lenses, the correction processing unit executing the correction when the deformation estimator determines the correction to be allowable.

4. An image processing method comprising:

a step of estimating deformation in an image of a subject wearing eyeglasses, the eyeglasses including a pair of lenses in symmetry, the estimating deformation step being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses wherein the estimating deformation step identifies a lower-end tangent passing through lower ends of the pair of lenses, identifies an out-of-lens contour intersection point as an intersection point of the identified lower-end tangent and an out-of-lens contour line as a facial contour detected outside the pair of lenses, identifies an in-lens contour intersection point as an intersection point of the identified lower-end tangent and an in-lens contour line as a facial contour detected inside the pair of lenses, and uses the out-of-lens contour intersection point and the in-lens contour intersection point to estimate the deformations; and a step of calculating correction ratios of images inside both the pair of lenses based on the estimated deformations and using the calculated correction ratios to correct the images inside the pair of lenses.

5. A non-transitory computer-readable recording medium storing an image processing program for controlling an image processing apparatus, the image processing program causing the image processing apparatus to function as:

a deformation estimator for estimating deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, wherein the deformation estimator identifies a lower-end tangent passing through lower ends of the pair of lenses, identifies an out-of-lens contour intersection point as an intersection point of the identified lower-end tangent and an out-of-lens contour line as a facial contour detected outside the pair of lenses, identifies an in-lens contour intersection point as an intersection point of the identified lower-end tangent and an in-lens contour line as a facial contour detected inside the pair of lenses, and uses the out-of-lens contour intersection point and the in-lens contour intersection point to estimate the deformations; and a correction processing unit for calculating correction ratios of images inside both the pair of lenses based on the estimated deformations and using the calculated correction ratios to correct the images inside the pair of lenses.

6. An image processing method comprising:

a step of estimating deformation in an image of a subject wearing eyeglasses, the eyeglasses including a pair of lenses in symmetry, the estimating deformation step being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, the estimating deformation step calculating a lens width ratio as a ratio of widths of both the pair of lenses, and determining an allowability of the correction when the lens width ratio is in a range of a predetermined threshold value; and a step of calculating correction ratios of images inside both the pair of lenses based on the estimated deformations and using the calculated correction ratios to correct the images inside the pair of lenses, the calculating correction ratios step executing the correction when the estimating deformation step determines the correction to be allowable.

7. An image processing method comprising:

a step of estimating deformation in an image of a subject wearing eyeglasses, the eyeglasses including a pair of lenses in symmetry, the estimating deformation step being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, the estimating deformation step executing a face-recognition process, using the face-recognition process to estimate an inclination angle of the face, and determining the allowability of the correction based on the inclination angle; and a step of calculating correction ratios of images inside both the pair of lenses based on the estimated deformations and using the calculated correction ratios to correct the images inside the pair of lenses, the calculating correction ratios step executing the correction when the estimating deformation step determines the correction to be allowable.

8. A non-transitory computer-readable recording medium storing an image processing program for controlling an image processing apparatus, the image processing program causing the image processing apparatus to function as:

a deformation estimator for estimating deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, the deformation estimator calculating a lens width ratio as a ratio of widths of both the pair of lenses, and determining an allowability of the correction when the lens width ratio is in a range of a predetermined threshold value; and a correction processing unit for calculating correction ratios of images inside both the pair of lenses based on the estimated deformations and using the calculated correction ratios to correct the images inside the pair of lenses, the correction processing unit executing the correction when the deformation estimator determines the correction to be allowable.

9. A non-transitory computer-readable recording medium storing an image processing program for controlling an image processing apparatus, the image processing program causing the image processing apparatus to function as:

a deformation estimator for estimating deformation in an image of a subject wearing eyeglasses, the eyeglasses including a pair of lenses in symmetry, the estimation being performed such that when facial contours on both sides are detected inside both the pair of lenses, positions of the detected contours on both sides are used to estimate respective deformations inside both the pair of lenses, and when one of the facial contours is detected inside one of the pair of lenses, a position of the detected one contour is used to estimate deformations inside both the pair of lenses, the deformation estimator executing a face-recognition process, using the face-recognition process to estimate an inclination angle of the face, and determining the allowability of the correction based on the inclination angle; and a correction processing unit for calculating correction ratios of images inside both the pair of lenses based on the estimated deformations and using the calculated correction ratios to correct the images inside the pair of lenses, the correction processing unit executing the correction when the deformation estimator determines the correction to be allowable.

* * * * *